United States Patent
Scholz

(10) Patent No.: US 8,894,848 B2
(45) Date of Patent: Nov. 25, 2014

(54) WATER FILTER DEVICE WITH CONTROL UNIT FOR SETTING A CUTTING RATIO

(75) Inventor: Roland Scholz, Balgach (DE)

(73) Assignee: Aquis Wasser-Luft-Systeme GmbH, Lindau, Zweigniederlassung Rebstein, Rebstein (CH)

( * ) Notice: Subject to any disclaimer, the term of this patent is extended or adjusted under 35 U.S.C. 154(b) by 1047 days.

(21) Appl. No.: 12/448,479

(22) PCT Filed: Dec. 21, 2007

(86) PCT No.: PCT/EP2007/011364
§ 371 (c)(1),
(2), (4) Date: Sep. 17, 2009

(87) PCT Pub. No.: WO2008/077622
PCT Pub. Date: Jul. 3, 2008

(65) Prior Publication Data
US 2010/0059424 A1    Mar. 11, 2010

(30) Foreign Application Priority Data
Dec. 22, 2006   (DE) .................. 10 2006 062 142

(51) Int. Cl.
*B01D 35/147* (2006.01)
*C02F 1/42* (2006.01)
*B60R 3/02* (2006.01)
*C02F 9/00* (2006.01)
*C02F 1/00* (2006.01)
*A47J 31/60* (2006.01)
*C02F 1/68* (2006.01)
*C02F 5/00* (2006.01)

(52) U.S. Cl.
CPC ............. *B60R 3/02* (2013.01); *C02F 2301/063* (2013.01); *C02F 1/42* (2013.01); *C02F 9/005* (2013.01); *C02F 2201/006* (2013.01); *C02F 1/003* (2013.01); *A47J 31/605* (2013.01); *C02F 1/68* (2013.01); *C02F 1/688* (2013.01); *C02F 2301/043* (2013.01); *C02F 5/00* (2013.01)
USPC .......................... 210/101; 210/130; 210/234

(58) Field of Classification Search
CPC .......... A47J 31/605; B60R 3/02; C02F 1/003; C02F 1/42; C02F 1/68; C02F 1/688; C02F 2201/006; C02F 2301/043; C02F 2301/063; C02F 5/00; C02F 9/005
See application file for complete search history.

(56) References Cited

U.S. PATENT DOCUMENTS

| 3,038,610 A | 6/1962 | Hetherington |
| 4,145,279 A * | 3/1979 | Selby, III ...................... 210/614 |
| 4,196,081 A | 4/1980 | Pavia |
| 2005/0115883 A1* | 6/2005 | Takemoto et al. ............. 210/282 |

FOREIGN PATENT DOCUMENTS

| DE | 29 10 869 A1 | 9/1980 |
| DE | 29 40 144 A1 | 4/1981 |
| DE | G 87 13 769.0 | 1/1988 |
| DE | 44 22 709 A1 | 1/1996 |
| DE | 297 00 941 U1 | 7/1998 |

(Continued)

*Primary Examiner* — Dirk Bass
(74) *Attorney, Agent, or Firm* — Breneman & Georges

(57) ABSTRACT

The present invention relates to a water-filter device. This is distinguished by the provision of an adjusting medium (5) of which the volume and/or the structure change/changes by way of a liquid (6) which is in contact with the adjusting mechanism (1) and/or has flowed through the adjusting mechanism (1).

40 Claims, 8 Drawing Sheets

(56) References Cited

FOREIGN PATENT DOCUMENTS

Figure 1:
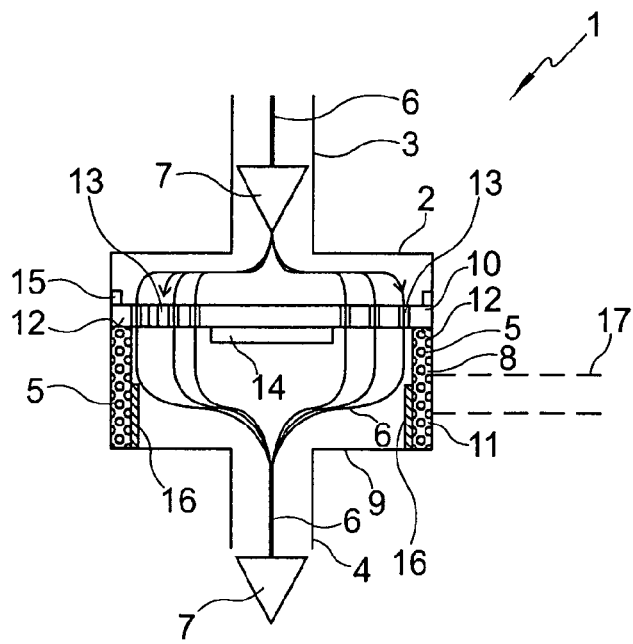

| DE | 198 12 436 A1 | 9/1999 |
| DE | 10 2004 049876 A1 | 4/2006 |
| EP | 0 844 339 A2 | 5/1998 |
| EP | 1 106 578 A1 | 6/2001 |
| JP | 07 308531 A | 11/1995 |
| WO | WO 01/80967 A1 | 11/2001 |
| WO | WO 2004/007374 A1 | 1/2004 |

\* cited by examiner

WATER FILTER DEVICE WITH CONTROL UNIT FOR SETTING A CUTTING RATIO

CROSS REFERENCE TO RELATED APPLICATIONS

This application is related to subject matter in U.S. application Ser. No. 12/448,477 entitled WATER FILTER DEVICE WITH DEPLETION DISPLAY.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

REFERENCE TO A "MICROFICHE APPENDIX"

Not applicable.

BACKGROUND OF THE INVENTION (1) Field of the Invention

The present invention relates to a water-filter device having an adjusting mechanism for setting a mixing ratio, and to a water tank which is provided for accommodating the filter device, to an appliance with a water tank, and to a filter appliance having a water filter device with one or more sections for treating water, in particular by ion exchange and having an adjusting mechanism for setting a mixing ratio between water treated by the filter section and water which is guided past the filter section via a bypass section and is not treated or is treated some other way that is characterized by the provision of an adjusting mechanism of which the volume and/or structure change/changes by way of a liquid which is in contact with the adjusting mechanism and/or has flowed through the adjusting mechanism as well as water tanks having an insertable filter cartridge which accommodates the foregoing water filter device, appliances with a water tank having the foregoing water filter device and filter appliances having a filter head with the foregoing water filter device.

(2) Description of Related Art Including Information Disclosed Under 37 C.F.R. 1.97 and 1.98

Filter devices for treating a liquid and having a mixing device for the admixture of liquid which is not treated, or has been treated elsewhere, to the liquid treated in the filter section have been known for some time now, in some cases with a possible means of adjusting the mixing device. As far as the treatment goes, the liquid is treated chemically and/or physically, for example water is softened, dealkalized, demineralized or the like.

Essentially two types of filter devices have been established. A first type of filter device is constituted by line-dependent, pressurized filter systems, e.g. so-called "filter candles", which can be integrated in the supply line of a water-discharge point or water-discharge device, preferably in the form of an interchangeable unit.

On the other hand, in addition to these filter candles, so-called "filter cartridges", in the form of line-independent filter devices, have proven expedient, usually in conjunction with a corresponding mater tank.

The mixing devices mentioned in the introduction are provided for setting a water quality which is predetermined for the respective application, in order for water treated via a filter section to be mixed with water which is not treated or is directed via a further filter section.

Such systems are used, for example, as a central or decentralized installation for treating drinking water in private households, for supplying discharge points, specifically for supplying modern kitchen appliances (water faucets and ice-makers in modern refrigerators or coffee machines) and also in the commercial sector for supplying drinks machines for preparing coffee, steam, hot or cold water for optimizing the taste of the food and drinks treated or prepared therewith and for protecting the machines against water-induced technical problems.

The mixing arrangements which have been customary until now in the application area described are set at the beginning of operation, by means of an adjusting mechanism for controlling a liquid stream, to a predetermined mixing ratio which is determined from the mineral content and/or hardness content of the input water, this content being known or determined by a short test, and from the quality of the filtrate water required for the application.

The output of the various treatment stages, however, becomes gradually depleted in dependence on the quantity of water already channeled via the treatment section and on the quality of the untreated water, so that, in the case of a mixing ratio fixed by means of an adjusting mechanism for controlling a liquid stream, the water quality produced changes continuously in dependence on the degree to which the treatment section has become depleted.

BRIEF SUMMARY OF THE INVENTION

It is an object of the present invention to improve a water-filter device of the type described in the Description of Related Art Including Information Under 37 C.F.R. 1.97 and 1.98.

This object is achieved by having a water filter device with one or more filter sections for treating water, in particular by ion exchange, and having an adjusting mechanism for setting a mixing ratio between water treated by the filter section and water which is guided past the filter section via a bypass section and is not treated or is treated some other way that is characterized by the provision of an adjusting mechanism of which the volume and/or structure change/changes by way of a liquid which is in contact with the adjusting mechanism and/or has flowed through the adjusting mechanism as well as water tanks having an insertable filter cartridge which accommodates the foregoing water filter device, appliances with a water tank having the foregoing water filter device and filter appliances having a filter head with the foregoing water filter device. Additional expedient and advantageous developments of the invention are achieved by having the volume and/or structure of the adjusting medium change in dependence on the quantity of the liquid which has flowed past the adjusting medium and/or through the adjusting medium, by having the adjusting medium changed in dependence on a physical and/or chemical property of the liquid which has flowed through it, by having a shrinkable adjusting medium, by having an adjusting medium which expands and/or is capable of swelling, by having a food compatible adjusting medium, by having an adjusting medium that is suitable as a health-promoting nutritional supplement and/or as a food supplement and/or as a drinking water additive, by having vitamin C, limestone and dolomite rock, flavorings, food base materials, siliphosphate, phosphate, phosphate combinations or polyphosphate used as the adjusting medium, by having the adjusting medium in the form of a powder, granules, crystals or compact, by having the adjusting medium in different three-dimensional structures, by having the adjusting medium in the form of an ion exchange resin, by having different adjusting media, by having the adjusting medium designed in the form of a closing element, by having the adjusting medium provided for actuating a closing element and/or an opening element, by having a restoring element, by having the adjusting mechanism arranged on an inflow and/or an outflow of a filter device, by having the adjusting mechanism provided for controlling a liquid stream in a filter device, by having the provision of a continuous adjustment of the mixing ratio, by having the provision of a threshold-value-dependent adjustment of the mixing ratio, by having a restoring element provided for closing and/or opening the mixing device, by having the adjusting medium provided for opening and/or closing the mixing device counter to the restoring force of the restoring element, by having the adjusting medium set a mixing ratio dependent on the quality of the water to be filtered and/or the respective application during an initializing operation of the water-filter device and/or following the same, by having the adjusting mechanism designed to change the mixing ratio during operation of the water filter-device, by having a substance that is to be filtered out of the water-filter device operate as the adjusting medium, by having at least one further adjusting medium, by having a means for indicating the degree to which the filter medium has been depleted, by having the adjusting medium designed as a valve, by having the adjusting medium operate as a control valve, by having the adjusting medium operate as a pilot valve, by having the adjusting medium assigned to a filter cartridge of the filter device, by having the adjusting medium assigned to a connection element for a filter cartridge of the filter device, by having an inlet into the filter housing designed to be open, by having the filter housing closed and provided with connection elements, by having the filter device designed in the form of a line independent filter device, by having the filter device designed in the form of a suction filter, by having the filter device designed in the form of a gravemetric filter device, by having the filter cartridge designed in the form of a filter device, by having a water tank designed for the aforedescribed water-filter device, by having a filter appliance with a filter head designed to accommodate the aforedescribed water-filter device by having an adjusting mechanism for setting a mixing ratio between drinking water treated by the filter section and water which is guided past the filter section via a bypass section and is not treated or treated in some other way where an adjusting medium in which the volume and/or the structure change/changes by way of a liquid which is in contact with the adjusting mechanism and/or has flowed through the adjusting mechanism where the adjusting mechanism is designed in the form of an independent enabling and/or closure element, by having the adjusting medium be a suitable health-promoting nutritional supplement and/or as a food supplement and/or as a drinking water additive, by having the adjusting medium be vitamin C, limestone and dolomite rock, flavorings, food base materials, siliphosphate, phosphate combinations or polyphosphate, by having the adjusting medium in the form of a powder, granules, crystals or compact, by having the adjusting medium in different three dimensional geometric structures, by having a restoring element, by having the adjusting mechanism disposed on an inflow and/or an outflow of the filter device, by having the adjusting mechanism designed that at least during an initializing operation of the water filter device and/or following the same, it sets a mixing ratio dependent on the quality of water which is to be filtered and/or on the respective application, by having the adjusting medium be a substance which is filtered out of the water-filter device, by having at least one further adjusting mechanism, by having a means for indicating the degree to which the filter medium has been depleted, by having the filter device designed in the form of a suction filter, by having the water filter device designed in the form of a gavimetric filter device, by having a filter head designed for the water filter-device, by having a water tank with an insertable filter cartridge with a filter device as previously described and having a water tank with a filter device as previously described.

A water tank for accommodating such a filter device is included within the scope of the invention which has one or more filter sections, for treating water, in particular by ion exchange, and having an adjusting mechanism for setting a mixing ratio between water treated by the filter section and water which is guided past the filter section via a bypass section and is not treated or is treated in some other way which has an adjusting medium in which the volume and/or the structure change/changes by a liquid which is in contact with the adjusting mechanism and/or has flowed through the adjusting mechanism or which has a drinking water filter having one or more filter sections for treating drinking water, in particular by ion exchange, and has an adjusting mechanism for setting a mixing ratio between drinking water treated by the filter section and drinking water which is guided past the filter section via a bypass section and is not treated or is treated in some other way, wherein there is provided an adjusting medium of which the volume and/or the structure change/changes by way of a liquid which is in contact with the adjusting mechanism and/or has flowed through the adjusting mechanism and which has an adjusting mechanism designed in the form of an enabling and/or closure element. Also an appliance for accommodating a water tank is included within the scope of the invention which has one or more filter sections, for treating water, in particular by ion exchange, and having an adjusting mechanism for setting a mixing ratio between water treated by the filter section and water which is guided past the filter section via a bypass section and is not treated or is treated in some other way which has an adjusting medium in which the volume and/or the structure change/changes by a liquid which is in contact with the adjusting mechanism and/or has flowed through the adjusting mechanism or which has a drinking water filter having one or more filter sections for treating drinking water, in particular by ion exchange, and has an adjusting mechanism for setting a mixing ratio between drinking water treated by the filter section and drinking water which is guided past the filter section via a bypass section and is not treated or is treated in some other way, wherein there is provided an adjusting medium of which the volume and/or the structure change/changes by way of a liquid which is in contact with the adjusting mechanism and/or has flowed through the adjusting mechanism and which has an adjusting mechanism designed in the form of an enabling and/or closure element. In addition a filter appliance with a filter head for the insertion of a filter is included within the scope of the invention which has one or more filter sections, for treating water, in particular by ion exchange, and having an adjusting mechanism for setting a mixing ratio between water treated by the filter section and water which is guided past the filter section via a bypass section and is not treated or is treated in some other way which has an adjusting medium in which the volume and/or the structure change/changes by a liquid which is in contact with the adjusting mechanism and/or has flowed through the adjusting mechanism or which has a drinking water filter having one or more filter sections for treating drinking water, in particular by ion exchange, and has an adjusting mechanism for setting a mixing ratio between drinking water treated by the filter section and drinking water which is guided past the filter section via a bypass section and is not treated or is treated in some other way, wherein there is provided an adjusting medium of which the volume and/or the structure change/changes by way of a liquid which is in contact with the adjusting mechanism and/or has flowed through the adjusting mechanism and which has an adjusting mechanism designed in the form of an enabling and/or closure element.

Accordingly, the present invention, in respect of a first aspect, relates to a water-filter device which has one or more filter sections, for treating water, in particular by ion exchange, and having an adjusting mechanism for setting a mixing ratio between water treated by the filter section and water which is guided past the filter section via a bypass section and is not treated or is treated in some other way which has an adjusting medium in which the volume and/or the structure change/changes by a liquid which is in contact with the adjusting mechanism and/or has flowed through the adjusting mechanism or which has a drinking water filter having one or more filter sections for treating drinking water, in particular by ion exchange, and has an adjusting mechanism for setting a mixing ratio between drinking water treated by the filter section and drinking water which is guided past the filter section via a bypass section and is not treated or is treated in some other way, wherein there is provided an adjusting medium of which the volume and/or the structure change/changes by way of a liquid which is in contact with the adjusting mechanism and/or has flowed through the adjusting mechanism and which has an adjusting mechanism designed in the form of an enabling and/or closure element but which is distinguished by the provision of an adjusting medium of which the volume and/or the structure change/changes by way of a liquid which is in contact with the adjusting mechanism and/or has flowed through the adjusting mechanism.

Changing the volume and/or the structure of the adjusting medium which acts on the adjusting mechanism makes it possible for the liquid stream which is to be controlled to have its flow behavior influenced quite specifically to meet certain requirements by an adjusting mechanism constructed in such a way. It is thus provided, for example, for such an adjusting mechanism to influence the liquid stream such that it changes in a controlled manner, via a quite specific characteristic opening curve, from a fully blocked state to a fully open throughflow state and also, conversely, from a fully open throughflow state to a fully closed throughflow state.

In a first embodiment, it is provided, for example, to change the liquid stream on account of the change in volume and/or structure of the adjusting medium in dependence on the quantity of the liquid which has flowed past the adjusting medium and/or through the adjusting medium. For this purpose, use can be made, for example, of a so-called washing-out effect brought about by the relevant liquid in order to produce a throughflow and/or of a so-called clogging effect in order to produce a blockage for the liquid stream which is to be controlled. However, it is also provided for the adjusting mechanism to be controlled correspondingly in dependence on a physical and/or chemical property of the relevant liquid, which can also in combination with the adjusting mechanism be influenced in a throughflow-dependent manner as mentioned above.

The use of a liquid-soluble adjusting medium is considered to be particularly advantageous here. It is thus possible to open, for example, a previously closed throughflow channel for the relevant liquid in a fully application-specific manner with an increase in cross section, which can be predetermined in dependence on the operating duration, on the basis of one or possibly more parameters for the throughflow. Examples of possible application cases would be a bypass control means, switch-over to an additional or further flow path and the like.

The same inflow options apply, for example, for direct control by a shrinkable adjusting medium. Direct control by an adjusting medium which expands or is capable of swelling, in contrast, provides for the reduction in the effective throughflow cross section of a corresponding adjusting mechanism for controlling a liquid stream which can continue until the throughflow is fully closed. An example of a application case here would be the blockage of a certain fluid line in dependence on one or more parameters.

Recommended as being advantageous in particular is the use of an adjusting medium which is food-compatible, since this influences a drinking-water stream to outstandingly good effect. This drinking-water stream is provided, for example, in a drinking-water supply line, in a drinking-water treatment and/or supply installation, in an appliance which uses and/or consumes drinking water, or the like.

The same also applies to adjusting media which are suitable, for example, as a health-promoting nutritional supplement and/or as a drinking-water additive, such as, for example, for vitamin C, siliphosphate, phosphate combinations, polyphosphate or the like.

In further-preferred embodiments, powders, granules, crystals or compacts, for example, may also be provided as the adjusting medium, and the quite specific throughflow properties of these can be utilized for influencing the liquid stream. In particular the adjusting medium can have, for example, different three-dimensionally geometrical structures which influence the throughflow property of the relevant liquid stream. It is thus provided, for example, for the originally fully closed state to be influenced in an application-dependent manner, beginning with a slight trickling-through action, with a slowly or even a quickly growing increase in cross section in order to control the liquid stream.

By virtue of arranging an initially inoperative, flow-inhibiting and/or blocking component or body in the adjusting medium, a closing function is achieved as a result of the same being released. An example of a suitable closure means is an insoluble material which is originally bound in a soluble medium and is in the form of granules, alone or in combination with a screen, or else a sufficiently large sphere, and these, once freed, block, or at least markedly reduce, the originally open throughflow cross section of the adjusting mechanism.

It is also provided to use catalytic or biocatalytic/enzymatic reactions for influencing an adjusting medium. For example, adjusting media based on starch, pectin or other polymers could be suitable to react under the influence of enzymes and/or water constituents, e.g. minerals or water ions which are introduced by way of the supply water or by way of the filter, and to change in consistency, to dissolve, to shrink, to expand, to gel and the like.

As a further embodiment, it is also provided to use leavening agents as the adjusting medium, e.g. sodium bicarbonate, which, by contact with water in conjunction with water constituents, in particular water ions which are introduced or freed by way of the supply water or the filter, reacts and expands as a result of the formation of gas. This reaction can utilize, inter alia, the quantity of water ions introduced— which are freed proportionally by a dealkalizing resin, for example, on account of the hardness in the supply water.

Furthermore, this reaction could also be utilized for initializing a filter following contact with water.

It is further provided also to use an ion-exchange resin as the adjusting medium. This is because ion-exchange resins to increase or reduce their volume in accordance with the relevant contact, and thus are suitable for influencing the throughflow cross section of an adjusting mechanism equipped therewith.

In a special embodiment, it is also possible to provide, for example, different adjusting media in a combined manner, e.g. for realizing a quite specific behavior curve for opening, closing and/or switching over an adjusting mechanism equipped therewith.

In a first, straightforward embodiment, for example, a body formed from the adjusting medium could itself form the closing element. An adjusting medium which dissolves, shrinks or develops a permeable structure under the action of the liquid could thus function as an opener. An adjusting medium which swells or, in respect of its structure, becomes less permeable, could serve as a closing means.

In a modified embodiment, however, the adjusting medium could also be provided for actuating an additional closing element and/or opening element, preferably realizing the opposite operating function. It would thus be possible to control at the same time two or more liquid streams, in particular with alternating flow function (open to closed or vice versa), that is to say the adjusting medium would serve as an alternator.

The abovementioned embodiments thus serve as a fully autonomous enabling and/or closure element for a liquid, in particular for a supply of water. A first application example would be that of controlling a liquid stream in a water-supply and/or treatment installation, in particular in a filter designed, for example, in the form of an interchangeable element. The active force of the adjusting medium, this force preferably corresponding to the state of depletion of the filter means, controls the adjusting mechanism. In a user-friendly embodiment, the depleted adjusting medium, and also the additional closing and/or opening element can be removed together with a filter designed in the form of an interchangeable filter and to be replaced by a new one.

By a suitable control of the liquid stream, the adjusting element, furthermore, may even serve as an indicator for the state of depletion of the filter and/or of the adjusting medium, e.g. in that it interrupts the liquid-stream outlet to an increasing extent in dependence on the degree of depletion. In a straightforward embodiment, the adjusting element would be designed, for this purpose, in the form of a closing element, if appropriate also using a corresponding suitable restoring element. A visual indication of the degree of depletion is also possible, e.g. by the adjustment of a corresponding signaling means, for example a slide, rotary element, shutter or similar signaling elements.

A further example for using an indicating and/or protective element would be the use of such an adjusting mechanism in the inflow region of a consumer. For example, a spray or a water faucet could be protected against scaling by virtue of the depletion of a dealkalizing means installed for this purpose being indicated by closure of the corresponding line.

An adjusting mechanism corresponding to the embodiments explained above particularly advantageously influences the liquid stream autonomously in the interior of the filter device, quite specifically in dependence on predeterminable parameters. In particular, it is provided here to channel, or stop the flow of, the liquid stream through individual portions and/or regions of the filter or individual filter elements in dependence on the throughflow quantity of the liquid which is to be filtered and/or on the physical and/or the chemical property thereof. It is provided for the relevant parameters to reflect indirectly, or also directly, the state of depletion of one or more filter elements and, accordingly, to influence the liquid flow in the filter interior.

Two particularly preferred positions for arranging the adjusting mechanism in the filter device and/or a bypass section are the inflow and/or the outflow of the filter device as a whole or the inflow and/or the outflow of a certain filter portion. This allows straightforward control of the liquid stream in the filter device as a whole in dependence on a liquid which is flowing past the adjusting mechanism and/or through the adjusting mechanism. This liquid may be, for example, the liquid which is to be filtered, a sub-stream of this liquid which is to be filtered, the filtered liquid or a sub-stream thereof, or else also a liquid which is treated in some other way or some other liquid.

It is advantageous in particular here if the filter device comprises a mixing device for the admixture of liquid which is not treated, or is treated in some other way, to the liquid treated in the filter section, provision preferably being made for the mixing ratio of the mixing device to be adjusted by means of the adjusting mechanism, which can be actuated by the liquid which has flowed through it.

In a particularly preferred embodiment, furthermore, it is also possible to provide an adjusting mechanism which is designed such that, at least during an initializing operation of the water-filter device and/or following such an initializing operation, it sets an initial mixing ratio which is dependent on the quality of the water which is to be filtered and/or on the requirements of the respective consumer, in particular the mixing ratio even being one which is constant over the entire service life of the filter.

In the previously described application areas, the mixing devices are usually fixed from the outset or are fixed manually, at the beginning of operation, to a predetermined mixing ratio which is determined from the mineral content or hardness content of the input water, this content being known or determined by a short test, and from the quality of the filtrate water required for the application.

In comparison with these traditional water-filter devices with mixing ratios which are fixed from the outset, or can be set manually, for special applications, e.g. for preparing coffee or generating steam, the embodiment described has the advantage that it can be optimally set, at the beginning of the operation for which it is envisaged, in a manner adapted precisely to the current quality conditions respectively prevailing in the water which is to be treated, in which case it is possible to avoid both overly pronounced and also possibly overly weak performance of the substances treating the water. This has an advantageous effect both on the service life of the appliances which may be operated therewith and on the results of the production process and/or processing which is using the treated water, and allows optimal utilization of the available filter capacity. An example which may be mentioned here is the taste of a drink treated thereby, e.g. coffee, tea or similar hot drinks. It is also the case, however, for cold drinks which are treated that an optimally set water quality can have a very much positive effect on the taste and/or solubility of a drinks additive. A further application example would be that of optimizing the effectiveness of a washing agent which may be present, for example, in the case of a certain water hardness and/or of a certain concentration of a further water constituent.

Readjustment of the mixing ratio during operation of the water-filter device can advantageously give rise to a water quality which is modified, in particular, over most of the operating period of the water-filter device. This can be achieved particularly advantageously in conjunction with the above-described exemplary embodiment of an initial setting of the water-mixing ratio in dependence on the prevailing water quality.

A substance which is to be filtered out of the water-filter device may be provided particularly advantageously as the adjusting medium since it is dependent directly on the quality of the water which is to be treated. This makes it possible to achieve particularly precise mixing control in dependence on the depletion of the relevant water-treatment means. In the case of strong treatment and/or filtering performance, there is also strong interaction with the relevant adjusting medium, which, as the performance of the water-treatment and/or -filter means decreases, is likewise regressive, preferably with an identical characteristic curve of depletion, and can thus maintain the characteristic mixing curve for a very long period between a still acceptable lower value and a still acceptable upper value.

A water-filter device which can be adapted in a particularly elegant and, in particular, precise manner to the respectively prevailing water quality is achieved by the provision of at least one further adjusting mechanism, but in particular even more than one adjusting mechanism, for influencing a corresponding water stream and/or water sub-stream in the filter section, in a filter sub-section and/or in a bypass section and/or a bypass sub-section. On the one hand, in order to realize the functionalities which have already been described above, respectively independent adjusting mechanisms may be provided in order for it to be possible, for example, for the individual adjusting mechanisms to be designed precisely for the intended functionalities and/or to be provided with special adjusting media. On the other hand, the provision of a plurality of adjusting mechanisms in order to influence the water-treatment device in one and the same way can give rise to very precise coordination. In particular the invention provides the non-linear depletion behavior of the water-treatment and/or -filter means by correspondingly increasing or reducing the mixing ratio respectively at the beginning or the end of the operating period of the relevant means.

The possible operating combinations which are recommended for this purpose are both serial and parallel operating combinations and combinations of serial and parallel operating arrangements.

A parallel arrangement of adjusting mechanisms could provides, for example, an increased bypass cross section at the beginning of an operating phase of the water-treatment and/or -filter material in order to compensate for the filtering performance, which is comparatively high in this operating phase. Once a comparatively linear behavior-curve portion has been reached, a bypass section is closed. It is advantageous in particular for this bypass section to be adapted correspondingly in cross section to the depletion behavior of the treatment medium.

In the same way in one embodiment of the invention provides a parallel arrangement of adjusting mechanisms for the bypass section for the end of the operating period of the water-treatment means such that a (one or more) bypass section closes once a certain state of depletion of the treatment medium has been reached, and thus (further) adapts the effective bypass cross section correspondingly to the state of depletion of the filter section as a whole or provides also just to a certain portion of such a filter section.

A series arrangement of such adjusting mechanisms could be advantageous, for example, for the combination of a basic setting of the effective mixing cross section and/or of the mixing ratio which is set as a result and of one or even more further adjusting mechanisms which adapt the cross section of the respectively active bypass section during the operating period of the water-treatment and/or -filter material.

Combinations of such series and parallel arrangements of adjusting mechanisms are particularly advantageous, because it can be adapted specifically to certain application cases, for influencing in a depletion-dependent manner one or more mixing ratios in the water-filter device in order to produce as optimum a result for the water treatment achieved hereby, in particular over the entire operating period.

In particular when use is made of differently designed filter systems, it is necessary for the adjusting media to be adapted precisely to the supply water, to the capacity and to the application of the respective filters.

Since the liquid stream which is to be controlled by the above-described adjusting mechanism also flows through the filter device and/or its flow behavior in respect of the filter device is influenced by the adjusting mechanism, control mechanisms specified above also act on the filter device and/or filter sub-elements controlled thereby.

A more detailed description will therefore be given hereinbelow, in part also of the corresponding effect on the filter device.

In order to stabilize the filtering performance in accordance with the invention basically any type of filter can be equipped with a mixing device. Activation by means of the above-described adjusting mechanism assigned to the filter device makes it advantageously achieve an even filter quality, for the liquid flowing through the filter, which is sufficiently constant over most of the operating period of the filter device. This can take place, in dependence on the throughflow quantity and/or in dependence on a physical and/or chemical property of the liquid which has flowed through the filter and/or in dependence on the degree of exhaustion of an ion exchanger, corresponding to what has been said above in respect of the adjusting mechanism, by opening and/or closing one or more supply and/or control lines by means of such an adjusting mechanism.

Utilizing physical and/or chemical properties of the liquid flowing through the filter device is also conceivable for the two possible options explained above for influencing (closing/opening) the mixing ratio of the mixing device.

The mixing ratio can be adjusted, for example, such that, following activation of the filter device, which may comprise both a line-independent filter cartridge introduced into a vessel or a tank and a line-dependent filter candle, initially a quantity of liquid which is present at the filter exit and is not to be filtered through the actual filter material is larger than the quantity of liquid filtered through the filter material. During the operating period of the filter and/or the filter device, this mixing ratio can increase in favor of the liquid running through the filter material. This reduction in the fraction of unfiltered liquid in the overall liquid stream can take account of a filtering performance, for the liquid which has flowed through the filter, which usually decreases over the course of the operating period of a filter. As the mixing ratio decreases in favor of the quantity of liquid running through the actual filter material, it is thus possible for the liquid which is to be filtered to be set, for example, to a quality which is sufficient over a wide application area, on account of the increasing quantity of liquid which is no longer directed through filter-media-free portions or through partially depleted filter-media sections.

A variable-volume adjusting medium is also considered to be advantageous in particular here for adjusting the adjusting mechanism. It would thus be possible, for example, once again for decreasing volumes of the adjusting medium to be accompanied at the same time by a reduction in an active throughflow cross section for the liquid which is fed, for example, through a bypass line and is not directed through the filter material.

In addition to a reduction in volume of the adjusting medium, however, it is also possible, for example, using an adjusting medium which is capable of swelling as a result of an increase in volume, e.g. in conjunction with suitable means such as an adjusting valve or the like, likewise to achieve a reduction in the active throughflow cross section for the liquid which is not guided via the filter material, e.g. by way of a compressed nonwoven or a sponge.

The adjusting mechanism may form, in principle, a control valve, a pilot valve or else a reversing and/or switchover valve, in order to allow the liquid stream to be influenced quite specifically. In combination with the filter device, it is thus possible, in addition to the influencing of the inflow and/or of the outflow already described above, also to control one or more mixing sections and/or bypass sections in the filter device. The advantage of switchover and/or reversing functions of such an adjusting mechanism in relation to a filter device resides in the fact that a constant flow resistance for the liquid stream which is to be directed through the filter device can be ensured within the latter during its entire operating period. This, in turn, has a particularly stabilizing effect on the quality of the liquid stream which is to be filtered, on account of the internal-pressure conditions in the filter remaining constant.

For this purpose, it may be stated by way of example that, with a throughflowing liquid stream which is to be filtered being set at 70% at the beginning of a filter life cycle, it is possible to set a 30% mixing stream, which may possibly likewise be fed to a treatment portion. Such a filter portion for the mixing section may be, for example, a specifically designed treatment and/or filter portion, but it is also quite possible for it to be part of the filter provided for the main stream which is to be filtered, e.g. the dealkalizing portion, in which the two streams can then be reunited. In the embodiment with switchover and/or reversal of the mixing-stream ratio from mixing to filter stream, it is possible to avoid a reduction in the overall liquid stream running through. A particularly advantageous application case would be, for example, a water filter.

In the case of the volume-reducing form of a variable-volume adjusting medium, it would be possible to use for example, in turn, an adjusting medium which dissolves as a result of the liquid flowing through it, e.g. in the form of a powder, in the form of tablets, compacts, spheres or the like.

Depending on the form and/or solubility of such an adjusting medium, as seen over the operating period, it is possible for the mixing ratio to be controlled over a range from predominantly uniform adjustment, e.g. if use is made of a powder, right up to possibly abrupt adjustment, as could be the case, for example, with an adjusting medium which is able to maintain its basic structure essentially until it is fully dissolved. Such an adjusting medium may be constituted, for example, by a means which dissolves comparatively uniformly throughout its interior, but loses its basic structure only at the end of its dissolving process, for example a chitin complex.

A further possible way of rendering the mixing-adjustment ratio over the operating period of the filter used can also be achieved by a combination of two or more such differently dissolving, shrinking or expanding adjusting media. It is thus possible to achieve different phases in the mixing alteration on account of different dissolving behaviors and/or rates of shrinkage and/or expansion of the individual adjusting media.

It is also preferred in principle, for the purpose of controlling the filter and/or the mixing section, if the adjusting medium is a food-compatible adjusting medium, in which case it is thus also possible to actuate filter arrangements which filter liquids required on a daily basis, in particular water.

The suitability of the adjusting medium as a health-promoting nutritional supplement or water additive, e.g. a vitamin-C powder, polyphosphate, limestone and dolomite rock, possibly iodine or the like, provides here too a supply of nutrients, which can possibly even be specifically set, in respect of the basic daily requirements of the people, animals or plants consuming the liquid filtered in this way. It would also be possible to use flavorings, food supplements and other substances which serve to adjust taste or smell as the adjusting medium, and these could provide a specific means of enriching the supply water to make a drink.

The use of the adjusting medium for influencing the mixing ratio of the mixing device in dependence on the liquid which has flowed through could additionally take place, for example, with specific prestressing of the adjusting mechanism or of an element of the adjusting mechanism. Such prestressing of the adjusting mechanism or of its element can change depending on the change in volume of the adjusting medium, that is to say on the state of dissolution or swelling. It is considered to be particularly advantageous here if the adjusting mechanism comprises an additional restoring element, in particular for assisting the mixing-ratio control provided thereby.

Various embodiments are conceivable for the restoring element. On the one hand, such a restoring element may be designed in the form of a means having properties which act independently of the liquid flowing through and/or, in contrast, as a means having properties which are at least partially dependent thereon.

An example of an element which is independent, in respect of its restoring property, of the liquid flowing through could be a spring, an elastomer or the like. An example of a restoring element which is dependent, in respect of its restoring property, on the liquid flowing through could be a means which is capable of swelling, for example a compressed nonwoven or a possibly likewise compressed sponge, swelling resin, ion-exchange resin or the like.

In a particularly preferred embodiment, the restoring element is also provided for closing the mixing device. The mixing section can be closed, for example, by the interaction of two complementary closing elements. A possible embodiment would be, for example, a coaxial interengagement of two for example tubular elements, so that previously possible liquid throughflow in the direction of a filter exit is thus increasingly reduced, during the operating period of the filter, until full closure takes place.

In addition to two coaxial, complementary closing elements, however, another embodiment is also quite conceivable, e.g. the (en-)closure of a through-passage opening, leading to the filter exit, for the non-filtered fluid in the form of a valve or cover or the like.

In a particularly preferred embodiment, the above-described fluid-sensitive adjusting medium can be used for opening the mixing device counter to the restoring force of such a restoring element. This makes it possible to achieve an additional control function for influencing the mixing ratio of the mixing device.

Depending on the restoring property exhibited by the restoring element, the setting of the mixing ratio influences the mixing ratio in a continuous or else a threshold-value-dependent manner. For example spring elements, elastomers or the like are suitable for continuous adjustment. Examples of means or elements which are suitable for influencing the mixing ratio in a threshold-value-dependent manner, in particular with abrupt adjustment, are those with resistance values which change abruptly over the adjustment path, e.g. a latching element having a plurality of spaced-apart latching points.

In particular in conjunction with the above-cited food-compatibility of the adjusting medium, it is considered to be particularly advantageous if the filter is designed in the form of a water filter. Such a water filter may have, for example, an open inlet into the filter housing. Such an embodiment of an inlet is suitable, for example, for the use of tank solutions for storing a certain quantity of water which is to be filtered. It is possible to connect thereto, for example, suction means for instance in the form of negative-pressure-generating suction pumps for supplying a discharge point for filtered water. In this case, the filter would be a so-called suction filter.

Such suction means may be integrated in all possible water-processing and/or water-consuming household appliances and appliances for commercial use. A non-exhaustive list here may contain, for example, appliances used domestically and/or also for commercial purposes, such as drinks machines, in particular coffee machines, drinking-water dispensers, cooking and baking equipment, steam appliances, in particular steam irons, steam cleaners, high-pressure cleaners, air cleaners and air-conditioners or the like.

In a modified embodiment the filter housing is closed and provided with connection elements. This forms a so-called line-dependent filter system, in particular a so-called "candle solution". The adjusting mechanism for adjusting the mixing ratio of the mixing device here is preferably likewise integrated in the filter candle and could easily be exchanged, without any complications, together with the depleted candle. A further advantage of this embodiment would be, for example, that of the consumer not having to worry, as the filtration process is in progress, about any adjustment or change to the adjusting mechanism for setting the mixing ratio. Yet a further advantage would be that any inadmissible manipulation could not take place.

A further embodiment for a filter device is, for example, a gravimetric filter device. Such a device is distinguished in that the liquid stream, in particular a water stream, is forced through the filter on account of the liquid level being located above the filter. Exemplary embodiments are table-top filter appliances with two separate water reservoirs, a first for accommodating the water which is to be filtered and a second for storing the filtered water. Such filters are optionally equipped, in principle, with an adjusting mechanism and/or a mixing arrangement and/or a depletion-indicating means in accordance with the explanations above.

Also possible are embodiments in which the adjusting mechanism is designed in the form of an additional element, e.g. in the form of a plug-on and/or push-in mechanism. It would be conceivable with such an embodiment, for example, for the adjusting mechanism to be capable of functioning as a long-term mechanism for controlling the mixing of a relatively large number of exchangeable filter candles, until such time as the adjusting mechanism itself is depleted. A possible advantage here would be that of fewer corresponding adjusting mechanisms being required.

In order to allow for the consumption-dependent depletion of the filter function of the respective treatment medium of the filter system, it would be possible here, and also for the embodiments mentioned above, to provide step-like control for influencing the effective bypass-throughflow cross section. This should begin in each case, when use is made of a new filter candle, as far as possible with a full throughflow cross section and should end with the cross section being reduced until, once used up, it is possibly fully closed. If use is made of a new interchangeable filter element, correspondingly suitable means can then be used once again to enable a correspondingly large, effective cross section for the bypass line. This can be realized, for example, by segment-formed portions of the adjusting mechanism which, for example by a corresponding change in position of the adjusting mechanism relative to the filter candle which is to be used, allow the fluid coming from the bypass line to flow through a not yet consuming region of the adjusting mechanism.

In a further preferred embodiment, it is also possible for the mixing ratio of the mixing device to be controlled by the use of different adjusting media, in particular by a combination of individual adjusting media of this type or of a plurality of such adjusting media. It is thus possible to realize different adjustment characteristics which are suitable, for example, for different application purposes and/or for use for filtering liquids which differ in content concentration depending, for example, on the site of application, e.g. the mineral content or the hardness of a water which is to be filtered. In respect of the application purpose, it would be possible to distinguish between appliances envisaged for food-treatment use, e.g. drinks machines or the like, and appliances which are not envisaged for treating foods, e.g. cleaning devices.

The present invention also relates to a water tank with a filter cartridge which is designed in accordance with the above explanations and is provided, in particular, for use with one of the above-cited water-treating and/or water-processing appliances for domestic and/or commercial use.

In addition, the present invention also covers a corresponding appliance which is envisaged and/or suitable for supply from such a water tank and/or by way of a line-dependent connection in accordance with the above explanation. For a listing, which is explicitly non-exhaustive, reference is made once again here to the list of appliances which is given by way of example above.

The invention is also intended here to cover a filter appliance with a filter head and/or filter housing for the insertion of a filter insert corresponding to the embodiments explained above by way of example.

BRIEF DESCRIPTION OF THE SEVERAL VIEWS OF THE DRAWING(S)

Figure 5:
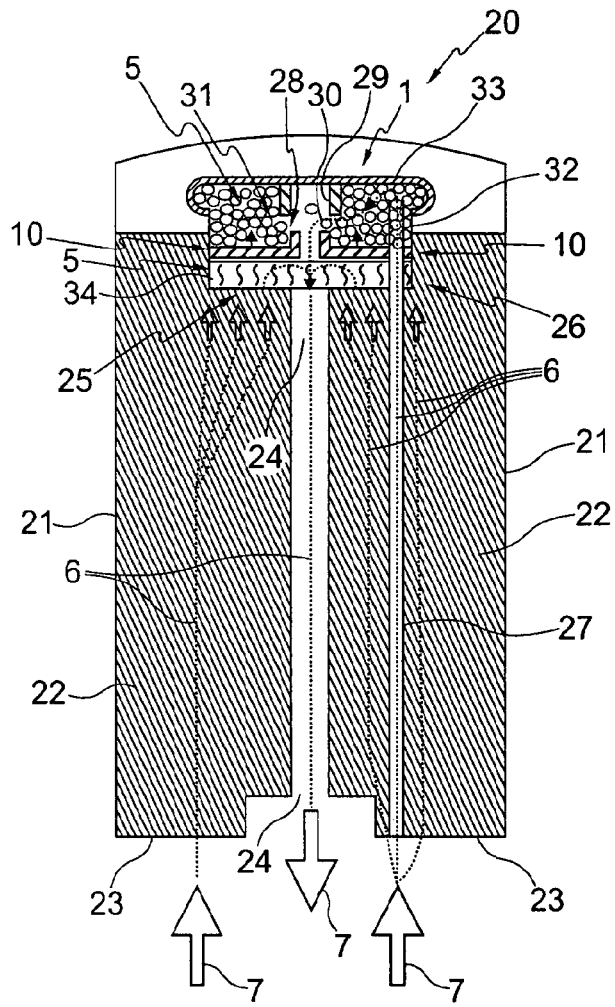
Figure 6:
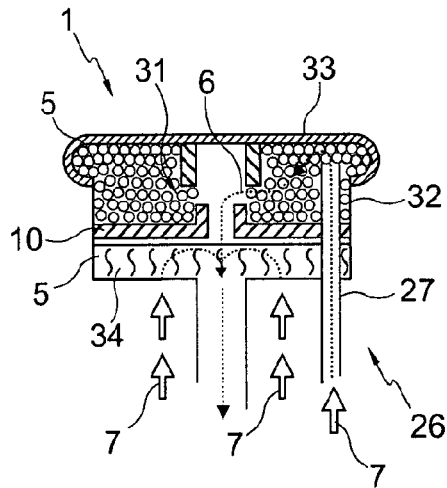
Figure 7:
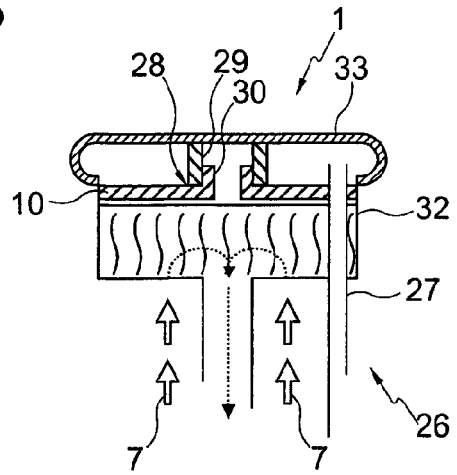
Figure 8:
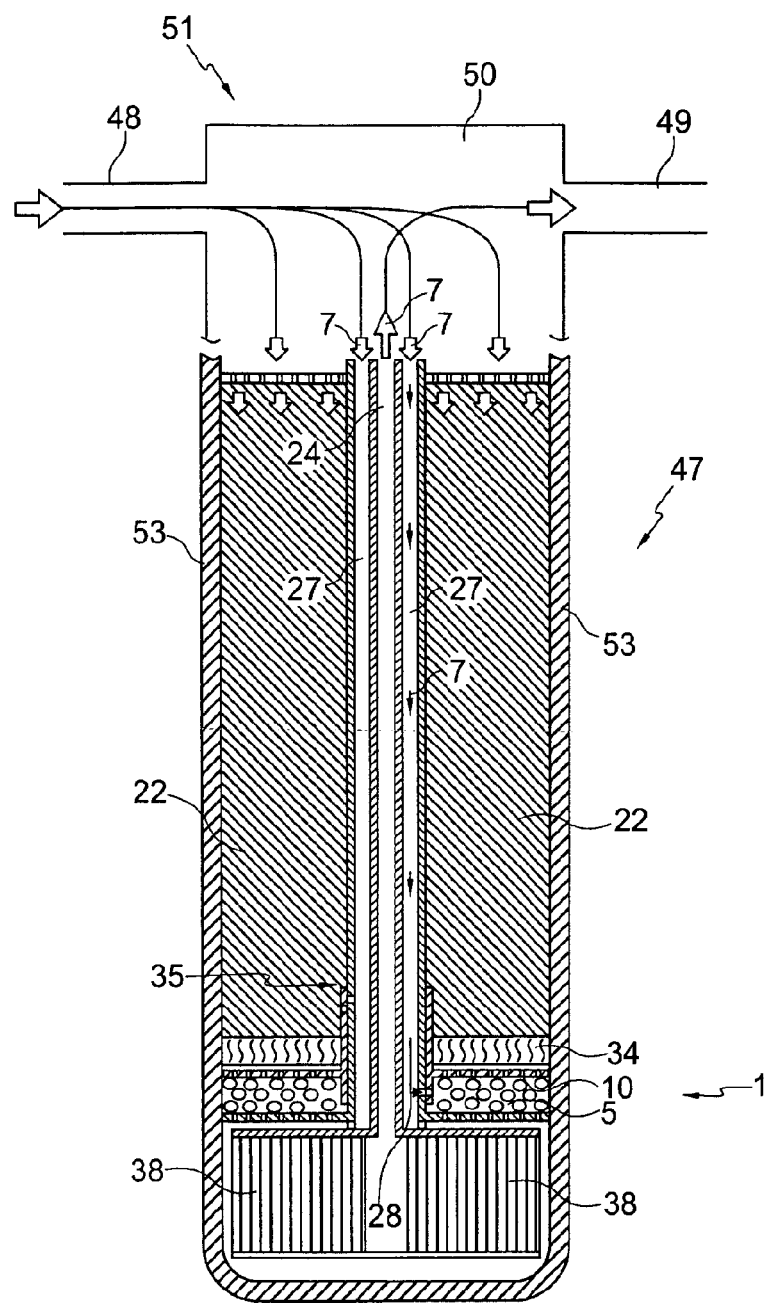
Figure 9:
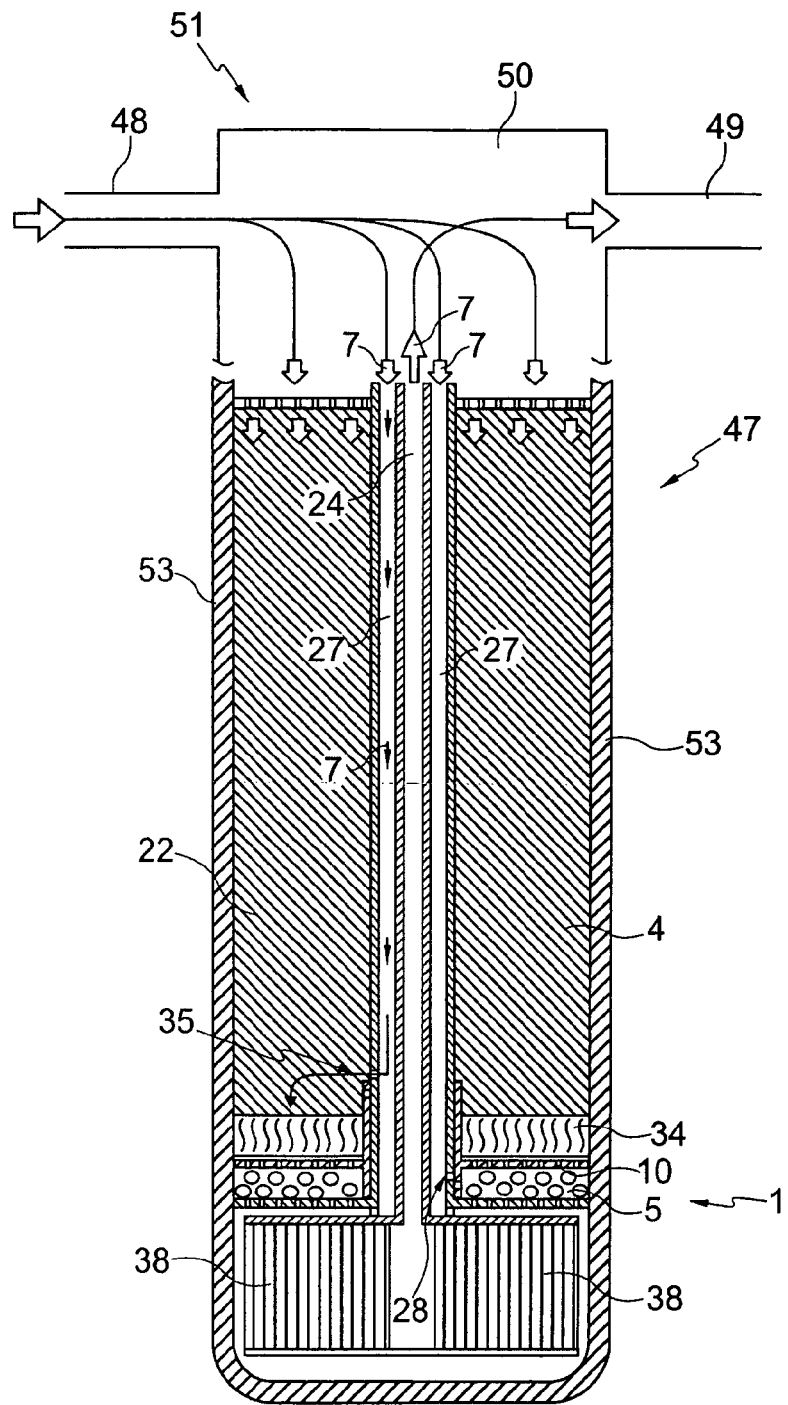
Figure 10:
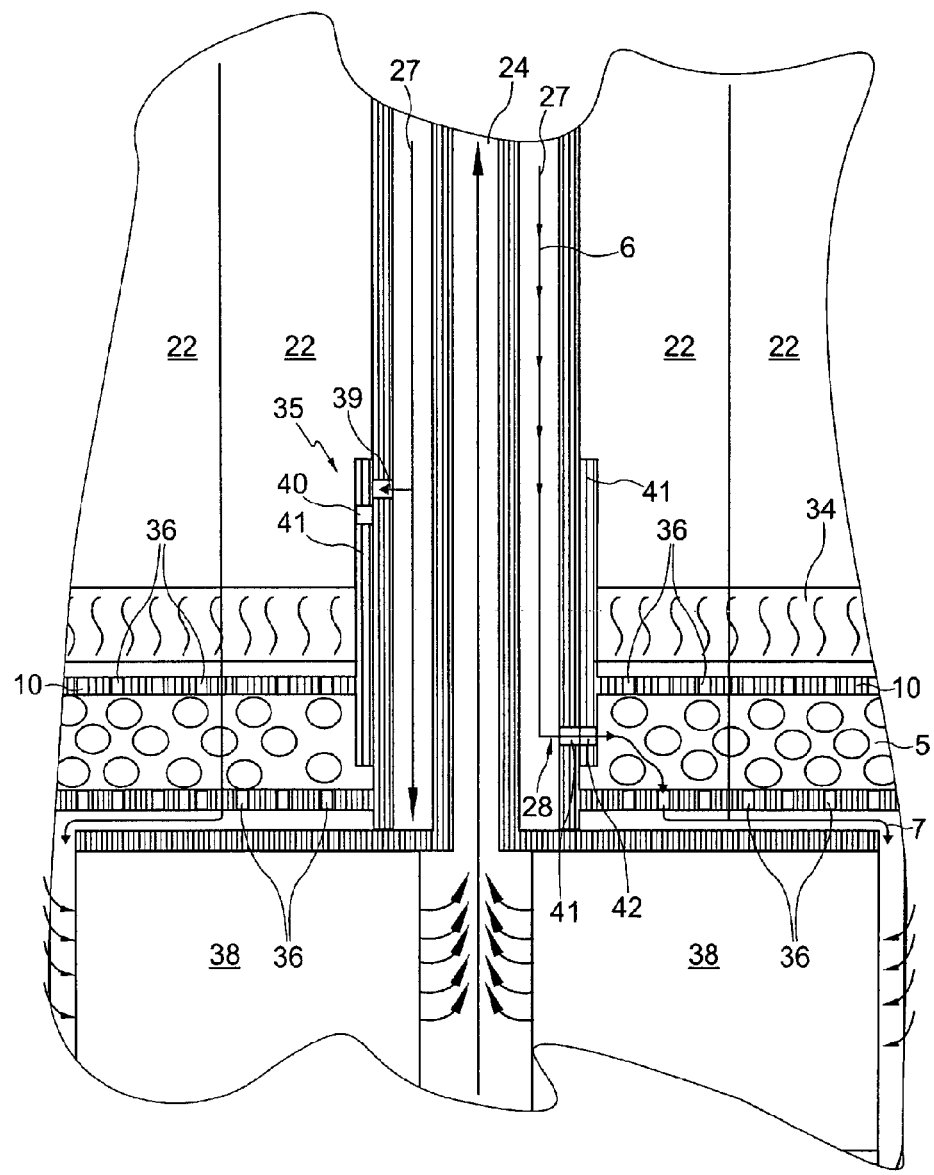
Figure 11:
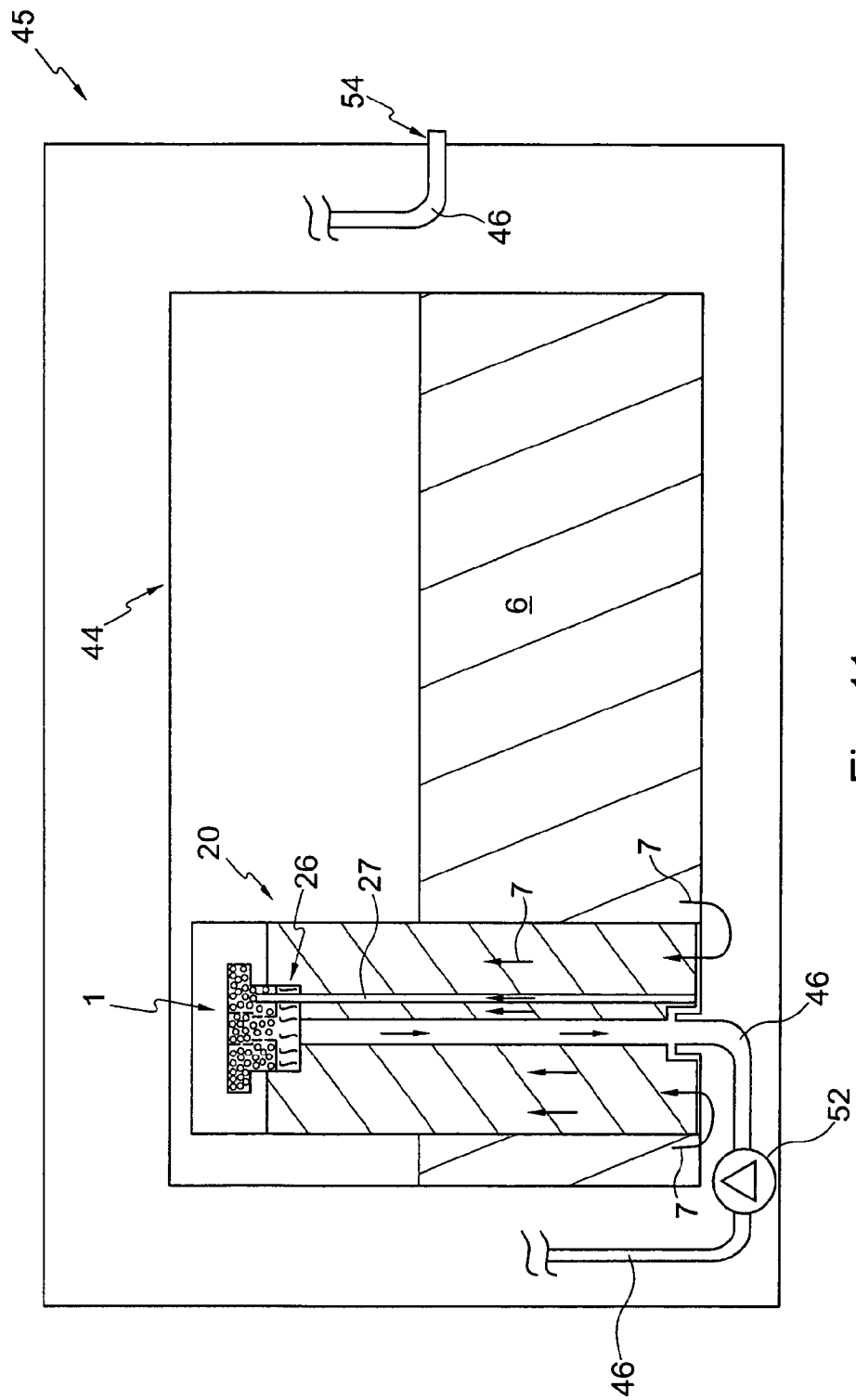
Figure 12:
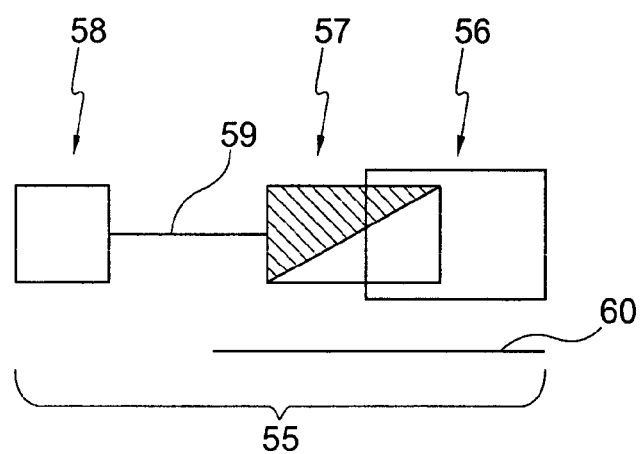

The present invention will be explained in more detail hereinbelow with reference to the accompanying figures, in which:

FIGS. 1 to 4 show, by way of example, schematic sectional illustrations of four different embodiments or operating states of an adjusting mechanism for controlling a liquid stream, FIG. 5 shows a filter device having an integrated adjusting mechanism for controlling a liquid stream, FIGS. 6 and 7 show two detail-formed views of the adjusting mechanism according to FIG. 5 in different control positions, FIGS. 8 and 9 show a further filter device having an integrated adjusting mechanism for controlling a liquid stream, in different control states, FIG. 10 shows a detail from FIG. 8 in order better to depict the adjusting mechanism which is shown in FIG. 8 and is intended for controlling a liquid stream, FIG. 11 shows a water-dispensing and/or -consuming appliance with a tank, a filter and an adjusting mechanism, and FIG. 12 shows a depletion-indicating means.

DETAILED DESCRIPTION OF THE INVENTION INCLUDING BEST MODE

In detail, then, FIG. 1 shows, by way of example, a schematic sectional illustration of an adjusting mechanism 1 which is intended for controlling a liquid stream 7 and has a housing 2, an inlet 3 and an outlet 4. Provided for the purpose of controlling this liquid stream 7 through the adjusting mechanism 1 is an adjusting medium 5 of which the volume and/or structure changes by way of the liquid 6 which has flowed through the adjusting mechanism, in particular in dependence on the quantity of the liquid 6 which has flowed past the adjusting medium 5 and/or has flowed through the adjusting medium 5. In an alternative embodiment of the invention a change in the adjusting medium is dependent on a physical and/or chemical property of the liquid 6 which has flowed through.

In the present case, the adjusting medium 5 is soluble in liquid and forms a ring 8 along the inner circumference of the housing 2. The housing could preferably be approximately cylindrical, in which case the ring 8 has or defines a structure which is correspondingly in the form of a tube portion.

The ring 8 has its lower end side 11 supported on the base 9, on the outlet side, in the interior of the housing 2. An adjusting element 10 in the form of a valve disk 10 provided with through-openings 13 rests on the upper end side 12 of the ring.

The liquid 6 can flow through the through-openings 13 in order to form the liquid stream 7 until such time as the ring 8 constructed from the liquid-soluble adjusting medium 5 has dissolved to the full extent or at least has its supporting structure weakened to the extent where the adjusting element 10, in the form of a valve disk, has its sealing region 14 resting with sealing action on the outlet 4.

In order for it to be possible to provide the overall construction of the adjusting mechanism, in particular the adjusting element 10 in the form of a valve disk, with a defined position in the interior of the housing 2, an abutment 15 is provided for that side of the adjusting element 10 which is located opposite the ring 8. This abutment may be designed, for example, in the form of an all-round or possibly even interrupted shoulder which projects into the interior of the housing 2 and against which the valve disk 10 can butt. In the new state of the adjusting mechanism 1, all the above-described elements are thus fixed in the interior of the housing 2. Once the adjusting mechanism has been subjected to the action of the liquid stream 7 which it is to control, the liquid-soluble adjusting medium 5 slowly dissolves, and the supporting structure of the ring 8 formed from the adjusting medium is weakened to the extent where the active force prevailing in the liquid stream as a result of the positive pressure on the inflow side is able to displace the adjusting element 10 in the direction of the outlet 4 until full closure takes place.

A ring 16 which is additionally formed within the ring 8, is preferably likewise constructed from a liquid-soluble adjusting medium, allows a stepwise increase in the throughflow resistance for the liquid 6 through the adjusting mechanism 1 on account of the fact that the disintegration of the supporting structure takes place comparatively more slowly over the length extent of this ring 16 than in that region of the ring 8 which does not have any such additional protective ring 16. The increased flow resistance for the liquid stream 7 is achieved as a result of the reduction in volume between the adjusting element 10 and the outlet 4 which is caused during displacement of the adjusting element 10. This makes possible, in turn, a reduction in the liquid stream 7 as a possibly desired means of indicating the depletion of the adjusting medium 5.

In order, in addition to a straightforward disabling function in the form of a switchover adjusting mechanism, FIG. 1 additionally shows, by way of example and in schematic form using the dashed-outlet lines, a further outlet 17. This second outlet 17 is enabled once the restraining forces for the adjusting element 10 which are formed by the additional ring 16 have been overcome. This takes place in that the hitherto existing sealing action of the remainder of the inner ring 8, originally supported by the additional ring 16, is eliminated. This allows the liquid 6 to flow out through the outlet 17. Merely for the sake of completeness, it should be pointed out here that the second outlet 17 may have any desired effective cross section, in particular also the same cross section as the outlet 4, which preferably, although not necessarily, is identical to the effective cross section of the outlet 4.

Once the supporting forces provided by the remainder of the ring 8 or 16 have broken down, the outlet 4 is closed by the adjusting element 10 on account of the pressure acting on the surface of the latter. From this point in time onwards, for the embodiment constituting an interchangeable adjusting mechanism with an additional, second outlet 17, the corresponding throughflow for the liquid stream 7 from the inlet 3 to the second outlet 17 is enabled. This second, exemplary embodiment of an adjusting mechanism in the form an interchangeable adjusting mechanism thus allows autonomous switchover, controlled in dependence on operating parameters, for a liquid stream from a first exit or outlet 4 to a second exit or outlet 17.

As a modification to the liquid-soluble adjusting medium 5, however, a shrinkable adjusting medium 5 may be provided for controlling the adjusting element 10 in accordance with the above explanation. It is preferred in particular if the adjusting medium is food-compatible, that is to say is suitable as a health-promoting nutrient and/or as a drinking-water additive. In particular vitamin C, siliphosphate, phosphate combinations or polyphosphate are recommended for this purpose. In this embodiment the adjusting medium 5 itself is a powder, crystals, spheres or even as a compact and in particular also to form different three-dimensionally geometrical structures which differ from the embodiment described above (ring 8, 16). Examples which could be mentioned here are columnar and/or lattice-like structures, solid and/or porous materials and/or structures formed therefrom, and the like.

Figure 2:
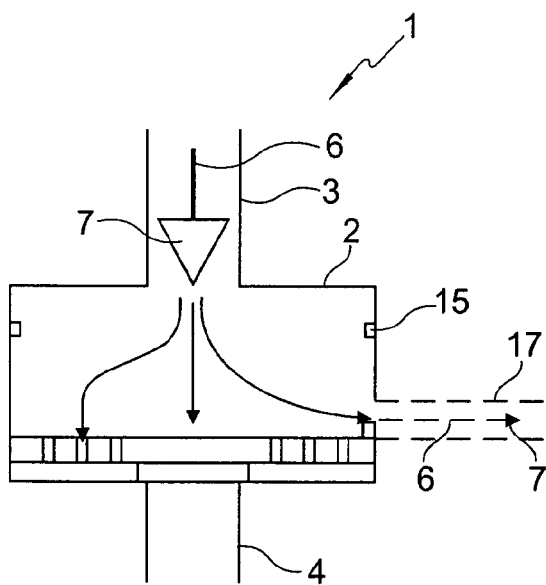

FIG. 2 shows, corresponding to FIG. 1, the same adjusting mechanism 1 for controlling a liquid stream 7, basically in the form of a disabling adjusting mechanism (disabling valve), but likewise with the same addition of a second outlet 17 illustrated schematically by dashed lines, with a liquid stream 7 illustrated by dashed lines, likewise only by way of example, for the case where this outlet 17 is actually present.

Figures 3, 4:
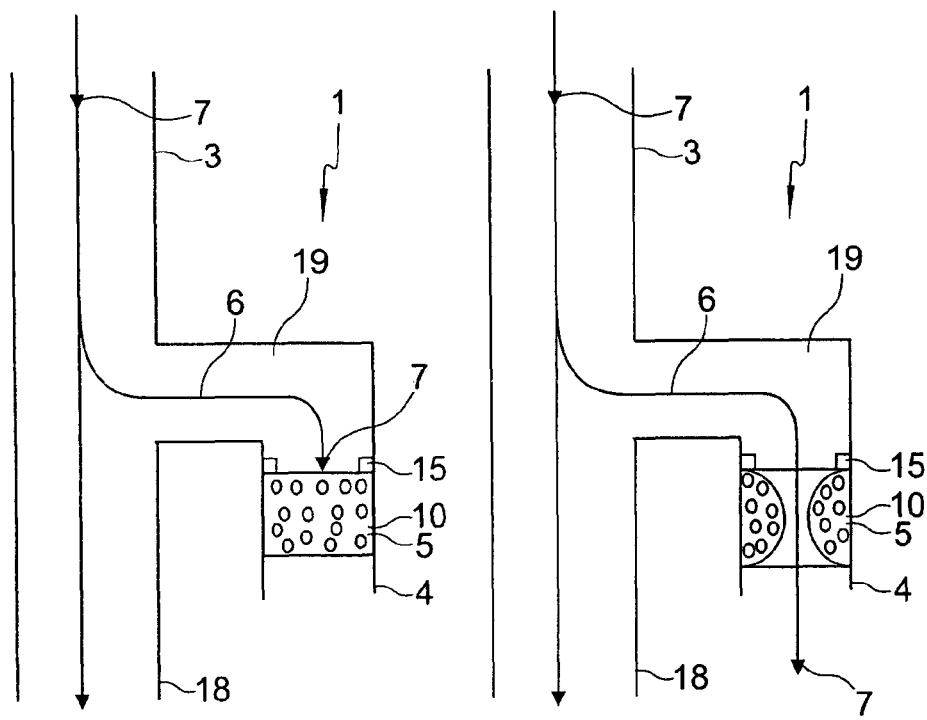

FIGS. 3 and 4 show a further embodiment of an adjusting mechanism 1 for controlling a liquid stream 7, this time with the adjusting medium 5 itself forming the adjusting element 10 which, when newly in operation, closes the outlet 4. Its structure and its volume change over the course of the operating period, by way of the liquid 6 which is in contact with the adjusting medium 5, such that the adjusting element 10, which is illustrated by way of example in the form of a stopper, can form, over the course of the operating period, a through-passage for the liquid stream 7 through the adjusting element 10. Such an adjusting mechanism 1 is suitable, for example, for enabling the outlet 4 in dependence on the quantity of liquid which flows past this flow path 6 (inflow 19) and passes out at the outlet 18.

The throughflow property of the adjusting element 10 can be controlled here, for example, by influencing the solution concentration of the liquid 6 in the inflow 19 upstream of the adjusting element 10. This can be realized, for example, via a corresponding exchange of concentrations in the two liquid-stream portions in the inflow 19 and in the outlet 18. As long as it is not possible for any liquid to pass out at the outlet 18, a saturated solution can be established in the inflow 19 without the volume of the stopper-like adjusting medium 5 being further reduced or, in particular, further dissolved. The throughflow state which has been established by operation up until then (closed, partially open or open) remains unchanged until further liquid flows through the adjusting mechanism 1.

This also applies to the other ways described above for influencing the permeability of an adjusting element 10, e.g. physical and/or chemical properties.

FIG. 5 shows, in accordance with a second aspect of the present invention, a filter device 20 in which is provided an adjusting mechanism 1 corresponding to the above explanations. The filter device 20 comprises a housing 21, a filter material 22 arranged therein and, illustrated symbolically by arrows, a liquid inflow 23 and a liquid outflow 24, via which the liquid 6 is channeled in order for the liquid stream 7 to be controlled.

The liquid 6 passes through the filter device 20 via the filter material 22 and penetrates into the housing 32 of the adjusting mechanism 1 from the underside, as illustrated here by way of example, through openings 25 and leaves this housing via the outflow 24. The openings 25 may be designed, for example, in the form of holes, as a screen, as a lattice or the like.

In order to influence the overall filtering performance of the filter device 20, the latter also comprises a mixing device 26 with a bypass line 27. Through this bypass line 27, some of the liquid stream 7 flows in the unfiltered state, past the filter material 22, into the interior of the adjusting mechanism 1. This unfiltered fraction of the liquid 6 comes into contact with the adjusting medium 5 in the interior of the adjusting mechanism 1, and this adjusting medium, depending on the material used for this purpose, therefore changes its volume and/or structure for the purpose of controlling the liquid stream 7.

In the example of FIG. 5, this adjusting medium 5 could preferably be, once again, a dissolving adjusting medium which decreases in volume during the dissolving process. The adjusting element 10, can also be designed for example in the form of a valve disk, to move up into this volume region which is becoming free and thus guide the two closing elements 29 and 30 toward one another and reduce the effective throughflow cross section of the through-opening 28, which leads to the liquid outflow 24, until it is fully closed.

The two closing elements 29, 30 are realized here, by way of example, as two coaxially interengaging extensions preferably in the form of tubular connecting pieces. The sealing fit 31 formed between them may be formed, for example, between the two facing surfaces of the two closing elements 29 and 30. However, it may also be formed additionally, or separately, between the end side of the upper closing element 29 and the opposite, upper surface region of the adjusting element 10. If required, it is even possible to provide an additional sealing element, e.g. in the form of an O-ring or the like, at a suitable location in order to form an axial and/or radial seal.

In order to achieve a reduction in volume in the housing 32 of the adjusting mechanism 1, between the adjusting element 10, which is designed in the form of a valve disk, and the cap 33 positioned on top, in a modified embodiment, to provide a shrinkable adjusting medium 5 is provided alone or, in combination with another adjusting medium 5. If these adjusting media 5 are arranged on the same side of the adjusting element 10, it is preferred in particular to combine a first medium with a second medium which likewise decreases in volume and/or weakens in structure, e.g. a dissolving medium and a shrinking medium. Correspondingly suitable forms, structures and materials have already been explained in detail above.

Furthermore, however, it is also possible to use an adjusting medium 5 which increases in volume, in which case, with the same construction as that described above, this adjusting medium should then be provided between the underside of the adjusting element 10 and the base of the housing 32 of the adjusting mechanism 1. The swelling property then causes it likewise to raise the adjusting element 10 in a corresponding manner in order for the two closing elements 29, 30 to be guided toward one another until sealing is achieved.

A certain adjusting medium 5 can be selected particularly preferably in accordance with properties and/or functions of the liquid which is to be filtered. Combining different adjusting media and/or different forms and/or structures of the adjusting media provides quite specifically predetermined curve profiles for the closing operation of the bypass arrangement. In addition to the combination of functionally identical adjusting media (volume-reducing or volume-increasing) a combination of adjusting media with different functions (volume-increasing and volume-decreasing) also provides for advantageous control options, e.g. homogenization and/or enhancement of the performance of the one adjusting medium by the performance of the second and/or even of a further adjusting medium. In one application of the invention for example, a homogenization of the reduction in the volume on the one side of the adjusting element 10 by assistance of a volume-increasing adjusting element arranged on the other side to the extent where the pressure brought to bear by the volume-increasing adjusting medium gives rise to an essentially constant, uniform distribution of the dissolving medium, and a predominantly continuous closing movement of the through-opening 28 is thus brought about.

In a modified embodiment, it is also conceivable for the forms and/or structures of one or both such combined adjusting media 5 to allow an abrupt change in volume. For the volume-reducing medium, it would be conceivable, for example to form columnar structures or the like which, following corresponding weakening by the action of the liquid, at least partially break down and thus abruptly reduce the volume. It is also conceivable here, however, to have combinations such as highly and poorly soluble fractions in the adjusting medium, on account of different dissolving behaviors and/or on account of different sizes or dimensions and the like.

A further way of influencing the adjusting behavior of the adjusting mechanism 1 by changing the position of the adjusting element 10 which can be realized by the provision of a restoring element 34. Depending on the function desired, such a restoring element, in turn, can act on the adjusting element 10 such that it assists the adjusting property of the latter by pulling or pushing. This restoring element may be, for example, an elastic spring element which can be subjected to tensile and/or compressive loading, a compressible or extendable elastomer, or any other elastically deformable element appropriate for the application case.

Both with and without an additional restoring element 34, the invention provides depending on requirements, for example a continuous, an abrupt and/or also a threshold-value-dependent adjustment of the mixing ratio.

In addition to the mixing ratio being controlled by closing the bypass line 27, as has been described up until now, with reference to the embodiment of FIG. 5, it is also possible, however, in accordance with the configurations in FIGS. 3 and 4, for a bypass line to be opened in order to control the liquid 6 forming the liquid stream 7. All the details explained in relation to closing control of a liquid stream also apply correspondingly to an opening device in the form of an adjusting mechanism 1. The reversal of the function of the adjusting element which is shown in FIG. 5 here only by way of example, and without reference to any figure, may be mentioned as a possible embodiment of such an adjusting mechanism 1. For this purpose, the positions of the volume-decreasing and of the volume-increasing adjusting media 5 and, if present, of the additional restoring elements 34 should be swapped over analogously.

In respect of the operating function of all such adjusting mechanisms 1, in addition to adjusting elements with a comparatively slow change in the effective throughflow cross section, the invention also provides for operating elements to be realized for example by way of the above described adjusting media which break down rapidly in terms of their operating resistance, e.g. in the form of a columnar supporting element.

All those embodiments of adjusting or operating elements which are explained above basically also provide in each case a corresponding valve with which a liquid stream can be controlled.

Such control valves or pilot valves may be designed not just in the form of a disabling or enabling valve, but also in the form of a switchover valve, as explained above by way of example with reference to FIGS. 1 and 2.

Such control and/or pilot valves may be used in order to influence all possible liquid streams. They are particularly preferably proposed for controlling water in line-dependent application cases, e.g. as an auxiliary unit for a water faucet, for a spray on a shower and, quite generally, for water-consuming appliances and/or devices. A first significant application area of such control elements or adjusting mechanisms is that of water-treatment means which are independent of pressure lines or delivery lines and can be supplied, for example, via a water tank.

Again with reference to the illustration in FIG. 5, it preferred here if the inlet 23 into the filter housing 21 is designed to be open. Such an embodiment may be realized, for example, as a plug-in filter cartridge, which is provided in a water tank 44 for a water-treating and/or water-consuming appliance 45. The overall control means of the filter 20 for as constant a filter quality as possible through the entire operating period of the filter, e.g. by way of a bypass control means, as explained above, for a mixing device, can thus be provided, without any additional measures, with such a filter device 20, also referred to as a filter candle, and, once depleted, exchanged therewith.

A second significant application case which will be described in more detail hereinbelow e.g. for a closed filter housing 53, for a corresponding filter 47 (FIGS. 8 to 10) could be, for example, a so-called filter cartridge 47 which is dependent on pressure lines or delivery lines. Provided with appropriate connection elements 48, 49, it can be integrated in a pressure line or delivery line, in particular in a service-connection water line.

Referring once again to the filter cartridge according to FIG. 5, this filter cartridge may also be designed in contrast, for a further application case, for example in the form of a suction filter 20, in which case the outlet 24 is connected to a suction device 52, e.g. of a water-consuming appliance 45 (FIG. 11).

Yet a further significant application case for such a water-filter cartridge would be a so-called "gravimetric filter device", e.g. for table-top filter appliances or the like. In this case, the level of a liquid which is to be filtered forces this liquid out of a first receptacle, through the filter, into a second receptacle provided for accommodating the filtered liquid. For this purpose, depending on the embodiment, it is possible for the filter inflow 23 to be provided, as is shown in FIG. 5, in the lower region of the filter or else further above or even right at the top.

All the filter devices described may be provided with an adjusting mechanism 1 according to the above explanations, in order for it to deliver a filter quality which is preferably constant over most of the operating period of the filter device, but at least is sufficiently good for the respective application case.

The control position for open throughflow through the bypass line 27 which is illustrated in FIG. 5 is shown in FIG. 6, for reasons of clarity, without the filter element 20.

FIG. 7 shows this adjusting mechanism 1, following a corresponding reduction in volume of the adjusting medium 5 originally introduced above the adjusting element 10, in the closed state. The liquid stream 7 through the bypass line 27 which is shown in the illustration of FIG. 6 has ceased in the illustration in FIG. 7. The two closing elements 29 and 30 butt against one another and close the through-opening 28.

FIGS. 8 and 9 furthermore show in detail, by way of example, the abovementioned, second significant embodiment of a filter device 47 with a housing 53 as may be provided, for example, in a filter appliance 51 with a filter head 50 for the insertion of such a filter insert 47.

In the view of FIG. 8, the adjusting mechanism 1, which is arranged in the filter housing 47, is illustrated in its new state. The adjusting medium 5, in this case for example in the form of granules, is shown, for this purpose, as a volume containing three rows of granules arranged one above the other. In contrast, FIG. 9 shows a state in which the granules have already been consumed to the extent where now two rows of granules of the adjusting medium form the decreasing volume. The bypass line 27 is shown here by way of example by two channels, a left-hand channel and a right-hand channel. It would also be possible, in principle, for these to be realized as a larger line running coaxially around the outlet line 24.

To give a better understanding, small arrows 7 are depicted in FIG. 8, in the right-hand part of the bypass line 27, in order to symbolize the liquid stream 7. They channel the liquid stream 7 through the through-opening 28 into that part of the adjusting mechanism 1 which is located beneath the adjusting element 10 and in which the adjusting medium, which is shown here by way of example in the form of granules, has been introduced and is reduced in volume by the liquid 6 of the liquid stream 7.

Following a corresponding reduction in volume, as is illustrated in FIG. 9, the outlet 28 is closed. Without any further measures being taken, a liquid stream 7 which is reduced in volume in relation to the open bypass arrangement would then flow through the filter device 47 and change the flow resistance prevailing therein. This, in turn, however would cause a change in quality of the filtering performance, which, in particular in small filters, may have very drastic consequences.

In order to avoid such adverse effects as a result of part of the liquid stream 7 which is to be filtered being disabled, it is therefore the case for this embodiment of the filter device 47, and by way of example for all the filter embodiments described here, that a further through-opening 35 is illustrated on the left-hand side of the bypass line 27, this through-opening being closed in FIG. 8 and being open in FIG. 9 on account of the reduction in volume of the adjusting medium 5. The adjusting mechanism 1 realized in this way thus acts, in this exemplary embodiment, as a reversing or switchover element for channeling the bypass stream of the mixing device.

In the illustration of FIG. 9, that fraction of the liquid stream 7 which in FIG. 8 has flowed through the adjusting medium 5 is channeled through the filter-section end portion, which on account of the advanced state of depletion of the filter material 4 is even more active in this lower filter-material region, which is directed toward the outlet, than in the upper region, which is directed toward the inlet.

An enlarged illustration of this diagram for controlling a liquid stream 7 is shown by way of example in FIG. 10 with reference to the illustration in FIG. 8. The through-opening 28 is open, and the liquid 6 which forms the liquid stream 7 can penetrate into the space in which the adjusting medium 5 is arranged, or has been introduced, and, in accordance with the envisaged control function, can reduce this adjusting medium in volume, e.g. by dissolving or by shrinking.

Following flow through this filter portion, the liquid 6 can continue flowing through holes 36, arranged in the base 37, in the interior of the filter 47 further downward through an additional filter material 38 (e.g. activated carbon or the like, for the purpose of filtering the otherwise unfiltered mixing stream) and then on to the outlet 24.

The through-opening 35 on the left-hand side of this illustration is correspondingly closed in FIG. 10 and has an opening 39 on the outer wall of the bypass line 27. With a corresponding reduction in the volume of the adjusting medium 5, the adjusting element 10 slides downward, as does the tubular cover plate 41 formed thereon, and thus releases the opening 39 in this left-hand bypass region in order for this liquid-stream fraction to be introduced into the lower region of the filter material 22.

For the case where an adjusting medium 5 which increases in volume is provided instead of an adjusting medium which decreases in volume, the same switchover function can be realized by virtue of the adjusting element 10 being raised and of the additional opening 40, which is provided in the cover plate 41, overlapping with the opening 39 in order to form the through-opening 35.

The disabling of the bypass section 27 on the right-hand side of the figure by virtue of the two openings 42 and 43 being offset in relation to one another on account of the tubular cover plate 41 being displaced in the longitudinal direction in relation to the bypass line 27 functions on account of the positioning of the two openings 42 and 43 in relation to one another both in the case of an adjusting medium 5 which decreases in volume and in the case of an adjusting medium 5 which increases in volume.

FIG. 11 supplements the graphic disclosure of the present invention by way of example by illustrating an adjusting mechanism 1 which is intended for controlling a liquid stream 7 and is arranged in a water filter 20 designed in the form of a plug-in filter. The adjusting mechanism 1 controls the bypass section of the mixing device 26, supplied by water from a tank 44. This tank 44, in turn, is assigned to a water-consuming appliance 45, e.g. an espresso machine, and supplies a discharge point 54 by means of a suction device 52, via the line 46. The interruption in the line 46 symbolizes any kind of treatment section, which may be present, for the water 6 supplied in this way in the appliance 45.

FIG. 12 shows, symbolically, an exemplary embodiment of a depletion-indicating means 55 with a signaling element 57 which indicates, in a window 56, the state of depletion of the water-treatment means. In dependence on the state of depletion of the water-treatment means, an adjusting member or sensor 58 changes the visual appearance of the signaling element visible in the window, e.g. in accordance with one of the above-described configurations, with swelling and/or shrinking action, dissolving action, volume-reducing and/or volume-increasing action or the like. For example this can take place by action on an adjusting means 59 in order to displace the signaling element 57 in the direction of the arrow 60.

LIST OF DESIGNATIONS

1 Adjusting mechanism
2 Housing
3 Inlet
4 Outlet
5 Adjusting medium
6 Liquid
7 Liquid stream
8 Ring
9 Base
10 Adjusting element
11 End side
12 End side
13 Through-opening
14 Sealing region
15 Abutment
16 Ring
17 Outlet
18 Outlet
19 Inflow
20 Filter device
21 Housing
22 Filter material
23 Liquid inflow
24 Liquid outflow
25 Opening
26 Mixing device
27 Bypass line
28 Through-opening
29 Closing element
30 Closing element
31 Sealing fit
32 Housing
33 Cap
34 Restoring element
35 Through-opening
36 Opening
37 Base
38 Filter material
39 Opening
40 Opening
41 Cover plate
42 Opening
43 Opening
44 Tank
45 Appliance
46 Line
47 Filter
48 Inflow
49 Outflow
50 Head
51 Filter appliance
52 Suction device
53 Housing
55 Depletion-indicating means 56 Window
57 Signaling element
58 Adjusting member/sensor
59 Connection
60 Arrow

What is claimed is:

1. In a drinking water-filter device having one or more filter sections for treating drinking water, and having an adjusting mechanism for setting a mixing ratio between drinking water treated by the filter section and drinking water which is guided past the filter section via a bypass wherein the improvement comprises an ion exchange device for treating drinking water or a filter medium in at least one filter section for treating drinking water and an autonomous adjusting medium in which the volume and/or the structure of the autonomous adjusting medium change or changes by way of a liquid (6) which is in contact with the autonomous adjusting medium (5) and/or has flowed through the autonomous adjusting medium which forms an adjustable bypass closure element disposed in the bypass, wherein said adjustable bypass closure element is opened or closed by said autonomous adjusting medium.

2. The water-filter device as claimed in claim 1 wherein the volume and/or the structure of the autonomous adjusting medium (5) is changed in dependence on the quantity of the liquid (6) which has flowed past the autonomous adjusting medium and/or through the autonomous adjusting medium.

3. The water-filter device as claimed in claim 1 wherein the autonomous adjusting medium (5) is the adjustable bypass closure element which changes in dependence on a physical and/or chemical property of the liquid which has flowed through it.

4. The water-filter device as claimed in claim 1 wherein said autonomous adjusting medium is a liquid-soluble autonomous adjusting medium (5).

5. The water-filter device as claimed in claim 1 wherein the autonomous adjusting medium is a shrinkable autonomous adjusting medium (5).

6. The water-filter device as claimed in claim 1 wherein the autonomous adjusting medium is an autonomous adjusting medium (5) which expands and/or is capable of swelling.

7. The water-filter device as claimed in claim 1 wherein the autonomous adjusting medium is a food-compatible autonomous adjusting medium.

8. The water-filter device as claimed in claim 1 wherein the autonomous adjusting medium is a health-promoting nutritional supplement and/or a food supplement and/or a drinking-water additive.

9. The water-filter device as claimed in claim 1 wherein the autonomous adjusting medium is vitamin C, limestone and dolomite rock, flavorings, food base materials, siliphosphate, phosphate combinations or a polyphosphate.

10. The water-filter device as claimed in claim 1 wherein the autonomous adjusting medium is a powder, granules, crystals or compact form.

11. The water-filter device as claimed in claim 1 wherein the autonomous adjusting medium has different three-dimensionally geometrical structures.

12. The water-filter device as claimed in claim 1 wherein the autonomous adjusting medium is an ion-exchange resin.

13. The water-filter device as claimed in claim 1 wherein the autonomous adjusting medium is a plurality of different types of autonomous adjusting media.

14. The water-filter device as claimed in claim 1 wherein a body (10) formed from the autonomous adjusting medium (5) is a bypass closure element.

15. The water-filter device as claimed in claim 1 wherein the autonomous adjusting medium (5) is an actuator for a closing element (10) and/or opening element (10).

16. The water-filter device as claimed in claim 1 further comprising a restoring element (24).

17. The water-filter device as claimed in claim 1 wherein the adjustable bypass closure element is arranged on an inflow (23) and/or on an outflow (24) of the filter device (20).

18. The water-filter device as claimed in claim 1 wherein the adjustable bypass closure element is provided for controlling a liquid stream (7) in the filter device (20).

19. The water-filter device as claimed in claim 1 wherein the adjustable bypass closure element provides a continuous adjustment of the mixing ratio.

20. The water-filter device as claimed in claim 1 wherein the adjustable bypass closure element provides a threshold-value-dependent adjustment of the mixing ratio.

21. The water-filter device as claimed in claim 1 further comprising a mixing device (26) and a restoring element wherein the restoring element (24) is provided for closing and/or opening the mixing device.

22. The water-filter device as claimed in claim 21 wherein the autonomous adjusting medium (5) is provided for opening and/or closing the mixing device (26) counter to the restoring force of the restoring element (34).

23. The water-filter device as claimed in claim 1 wherein the adjustable bypass closure element is designed such that, at least during an initializing operation of the water-filter device and/or following the same, it sets a mixing ratio which is dependent on the quality of the water which is to be filtered and/or on the respective application.

24. The water-filter device as claimed in claim 1 further comprising a filter head (50).

25. The water-filter device as claimed in claim 1 wherein a substance which is to be filtered out of the water-filter device is the autonomous adjusting medium.

26. The water-filter device as claimed in claim 1 comprising at least one further autonomous adjusting medium.

27. The water-filter device as claimed in claim 1 further comprising a means for indicating the degree to which the filter medium has been depleted.

28. The water-filter device as claimed in claim 1 wherein the adjustable bypass closure element is a valve.

29. The water-filter device as claimed in claim 1 wherein the adjustable bypass closure element is a control valve.

30. The water-filter device as claimed in claim 1 wherein the adjustable bypass closure element is a pilot valve.

31. The water-filter device as claimed in claim 1 wherein the adjustable bypass closure element is disposed in a drinking water filter cartridge of the filter device.

32. The water-filter device as claimed in claim 1 wherein the adjustable bypass closure element is disposed in a connection element of the bypass for a drinking water filter cartridge of the filter device.

33. The water-filter device as claimed in claim 1 further comprising a filter housing (21).

34. The water-filter device as claimed in claim 33 wherein the filter housing has connection elements (48, 49).

35. The water-filter device as claimed in claim 1 wherein the filter device (20) is a line-independent filter device.

36. The water-filter device as claimed in claim 1 wherein the filter device (20) is a suction filter.

37. The water-filter device as claimed in claim 1 wherein the filter device (20) is a gravimetric filter device.

38. A water tank with an insertable drinking water filter cartridge comprising:
(a) a water tank with an outlet;

(b) an insertable drinking water filter cartridge with a bypass, the insertable drinking water filter cartridge having one or more filter sections or at least one section for treating drinking water by ion exchange;
(c) an adjustable bypass flow orifice disposed in the bypass for setting a mixing ratio between drinking water treated by a filter section and drinking water which is guided past the filter section via the bypass; and
(d) an autonomous adjusting medium activated by a volume or a structure change resulting from a liquid in contact with or that has flowed through the autonomous adjusting medium to adjust the adjustable bypass flow orifice disposed in the bypass.

39. The water tank as claimed in claim 38 further comprising an appliance connected to the water tank.

40. An appliance (51) with a filter head comprising:
(a) a filter head adapted to accept a drinking water filter insert;
(b) a drinking water filter insert with a bypass, the drinking water filter insert having one or more filter sections for treating drinking water with at least one filter or ion exchange section for treating drinking water;
(c) an adjustable autonomously controlled valve disposed in the bypass to set a mixing ratio between drinking water treated by a filter section and water which is guided past a filter section; and
(d) an autonomous adjusting medium activated by a change in volume or structure resulting from a liquid in contact with the autonomous adjusting medium or liquid that has flowed through the autonomous adjusting medium which autonomously controls the adjustable autonomously controlled valve and changes a flow volume through the bypass by operation of the adjustable autonomously controlled valve disposed in the bypass.

* * * * *